United States Patent
Kang et al.

(10) Patent No.: US 7,366,204 B2
(45) Date of Patent: Apr. 29, 2008

(54) APPARATUS FOR GENERATING AND RESTORING RTP PACKET AND METHOD THEREOF

(75) Inventors: Sang-ug Kang, Anyang (KR); Austin Lobo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1150 days.

(21) Appl. No.: 10/401,752

(22) Filed: Mar. 31, 2003

(65) Prior Publication Data
US 2003/0185245 A1 Oct. 2, 2003

(30) Foreign Application Priority Data
Apr. 1, 2002 (KR) .......................... 10-2002-17833

(51) Int. Cl.
*H04J 3/06* (2006.01)
(52) U.S. Cl. .................... 370/503; 370/252; 370/389
(58) Field of Classification Search ................ 370/252, 370/253, 389, 392, 503
See application file for complete search history.

(56) References Cited
FOREIGN PATENT DOCUMENTS
WO 00/64119 10/2000

OTHER PUBLICATIONS

RTP Payload Format for MPEG-4 Streams dated Feb. 2002, Expires Mar. 2002, draft-ieft-avt-mpeg4-multisl-04.txt.*
RTP Payload Format for MPEG-4 Streams dated Sep. 2001, Expires Mar. 2002, draft-ietf-avt-mpeg4-multisl-02.txt.
Japanese Patent Office Action, issued Dec. 13, 2005, for corresponding Japanese Patent application No. 2003-098388 filed Apr. 1, 2003.
European Search Report. Application EP 03 25 1930, Search Completion Date Oct. 4, 2007 (in English).
P. Gentric et al., "RTP Payload Format for MPEG-4 Streams", Sep. 27, 2001 (Not enclosed because reference "RTP Payload Format for MPEG-4 Streams" was previously submitted in the IDS filed Jan. 13, 2006.).

* cited by examiner

*Primary Examiner*—Ricky G. Ngo
*Assistant Examiner*—Kibrom T Hailu
(74) *Attorney, Agent, or Firm*—Staas & Halsey LLP

(57) ABSTRACT

An apparatus and method to generate and restore an RTP (Real-Time Transmission Protocol) packet. A setting unit assigns a CTS (Composition TimeStamp), a DTS (Decoding TimeStamp), and a PSN (Packet Sequence Number) that sequentially increase according to a packet generation order for each of a plurality of SL (Synchronization Layer) packets, extracting a time stamp length and a packet sequence number length from an SLCD (SL Configuration Descriptor) within each SL packet. A packet generating unit generates a header of the SL packet accommodated in an RTP packet header and the RTP packet based on the CTS, the DTS, the PSN, the time stamp length and the packet sequence number length. Since only difference values in the CTS, the DTS, and the PSN information between a previous SL packet and the present SL packet, are recorded, a number of bits can be reduced if the CTS value rolls over and a multiple SL packet can be made for the SL packet having a time stamp length greater than 32 bits. Also, a condition that a DTS delta value should always be a positive number is met.

16 Claims, 7 Drawing Sheets

APPARATUS FOR GENERATING AND RESTORING RTP PACKET AND METHOD THEREOF

CROSS-REFERENCE TO RELATED APPLICATIONS

This application claims the benefit of Korean Application No. 2002-17833, filed Apr. 1, 2002, in the Korean Intellectual Property Office, the disclosure of which is incorporated herein by reference.

BACKGROUND OF THE INVENTION

1. Field of the Invention

The present invention relates to an apparatus and method for generating and restoring an RTP (Real-Time Transport Protocol) packet for transmitting an MPEG (Moving Picture Experts Group)-4 stream, and more particularly, to an apparatus and method capable of effectively encapsulating a plurality of SL (Synchronization Layer) packets for transmitting the MPEG-4 stream within an RTP packet.

2. Description of the Related Art

The Internet engineering task force (IETF) is an entity for defining a standard of an Internet operating protocol such as a TCP/IP (Transmission Control Protocol/Internet Protocol), and has subgroups assigned to each technical field. An RTP format for making the MPEG-4 stream a multiple synchronization layer (SL) packet and transmitting the same using a real-time transport protocol (RTP) is described in Draft-IETF-AVT-MPEG4-MULTISL-02.TXT.

Presently, a conceptual SL is defined in order to store transmission characteristics information such as time stamp and random access. When a MPEG-4 basic stream is transmitted, transmission information from the SL is generally mapped to a transmission layer.

Figure 1:
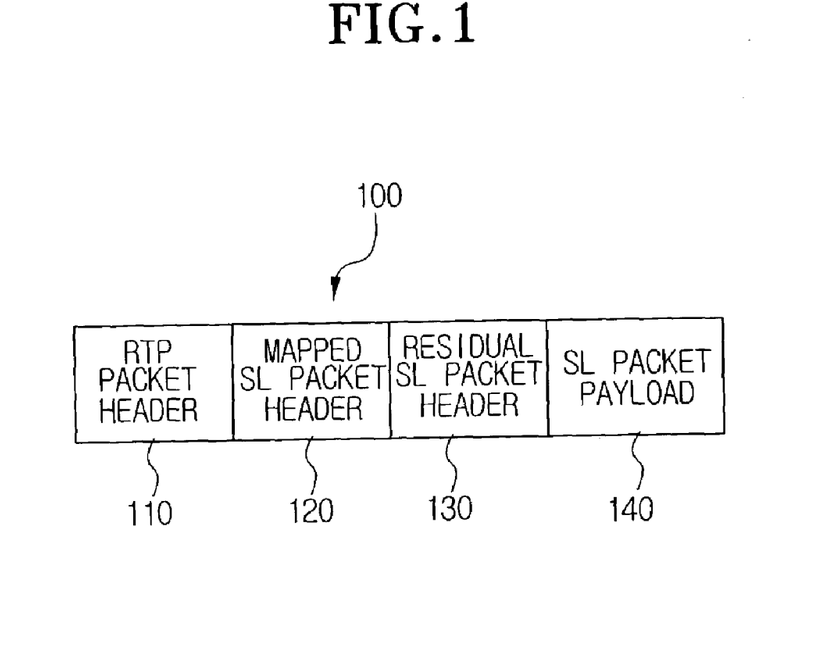
FIG. 1 is a drawing illustrating an embodiment of an RTP packet in which a plurality of SL packets is accommodated.

FIG. 1 is a drawing illustrating an RTP packet within which a plurality of SL packets is included. Referring to FIG. 1, the RTP packet 100 includes an RTP packet header 110, a mapped SL header 120, a residual SL packet header 130, and an SL packet payload 140.

The RTP packet header 110 has a fixed size and is followed by a specific information and data. Each field (not shown) will be briefly described in the following. A V field, is a version field and a P field is used for constructing a packet having 32 bits. An X field represents whether the header is extended, and a CC field represents a number of a CSRC (Contributing source identifier). An M field is a frame region for multimedia information. Namely, the M field is used for distinguishing voice from image information within the packet. A PT field denotes an RTP payload type of a profile defined by an RFC 1890 and interpreted by an application program. A sequence number field represents an order of the RTP packet, and a time stamp field represents a time point where sampling is made for a first octet of the RTP packet. An SSRC (Synchronization Source) field represents an identifier of a data source such as a camera and a microphone, and a CSRC field represents an identifier capable of distinguishing the sources in the case the RTP packets are mixed in an intermediate system.

Figure 2:
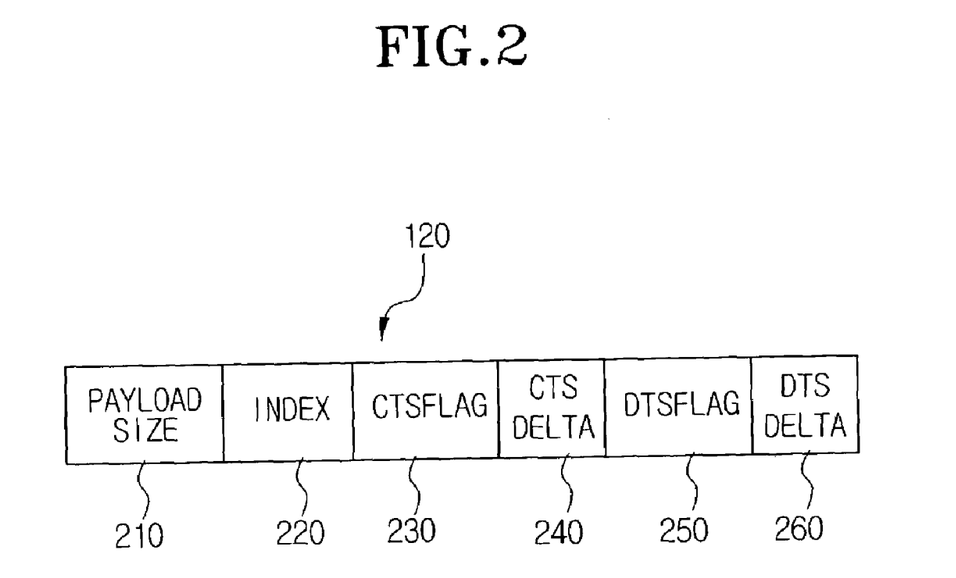
FIG. 2 is a drawing illustrating an embodiment of a structure of a mapped SL header.

FIG. 2 is a drawing illustrating an embodiment of a structure of a mapped SL header. The mapped SL header 120 includes: a payload size field 210, an index/index delta field 220, a composition time stamp flag (CTSFlag) field 230, a composition time stamp delta (CTSDelta) field 240, a decoding time stamp Flag (DTSFlag) field 250, and a decoding time stamp delta (DCTSDelta) field 260.

A size of a related SL packet located in the same RTP packet, is expressed in terms of a byte and stored in the payload size field 210. If the SL packet is divided, a payload size is a size of the whole SL packet.

On the index/index delta field 220, a serial number of a divided SL packet is recorded. The serial number of the SL packet is increased by one. The serial number is recorded on a first SL header only and is not recorded on a subsequent SL header. To encode the serial number on an SL header other than the first SL header, the index/index delta field 220 is used. On the index/index delta field 220, a difference in serial number between the present SL packet and the previous SL packet is recorded. Therefore, a serial number of an nth SL packet is obtained by adding one to a sum of an index of an n-1th SL packet and an index delta value of an nth SL packet. If each index/index delta field 220 is set to zero, a serial number of the SL packet is regarded as not specified, and a receiver ignores the index/index delta field 220.

On the CTSFlag field 230, whether the CTS delta exists is recorded. If the CTSFlag is one, the CTS delta exists, and the CTSFlag is zero, the CTS delta does not exist. If a CTS delta length is not zero, the CTS delta field 240 exists regardless of whether the SL packet is a beginning of a connection unit, and a value of the CTSFlag field 230 is zero for the first SL header and one for the SL headers after the first SL header. A size of the CTSFlag field 230 is one bit.

On the CTS delta field 240, a CTS value as expressed in terms of a complementary number of two for the time stamp existing within the RTP header of the RTP packet, is recorded. A number of bits for each CTS delta field 240 is specified by a CTS delta length parameter. Since the CTS of the first SL packet within the RTP packet is mapped as an RTP time stamp, the CTSFlag of a first multiple SL packet header for each RTP packet is always zero.

On the DTSFlag field 250, whether the DTS delta exists is recorded. If the DTSFlag is one, this indicates that the DTS delta exists, and if the DTSFlag is zero, this means that the DTS delta does not exist. A receiver requires the DTSFlag in order to reconstruct the decoding time stamp of the SL header. If the DTS delta length is not zero, the DTS delta field 260 exists regardless of whether the SL packet is a beginning of a connection unit, and a value of the DTSFlag field 250 is zero for the first SL header and one for the SL headers after the first SL header.

On the DTS delta field 260, a DTS delta, a value achieved by subtracting a decoding time from a generating time, is recorded. The DTS delta encodes the same SL packet and is always a positive number. A number of bits for each DTS delta field 260 is specified by a DTS delta length parameter. If the DTS delta is zero, namely, the generating time is the same as the decoding time, then the DTSFlag is zero and the DTS delta field 260 does not exist. A transmission side calculates the DTS delta, considering roll-over. For example, for an SL stream having (CTS,DTS) pairs such as (4,3), (5,4), (6, 5), (7,6), and (0,7), where a time stamp length is three, the DTS delta for the last pair should be one, not minus seven.

The residual SL packet header 130 is a residual portion after the SL packet is modified to map to the payload format mentioned above. On the residual SL packet 130, information not mapped to the RTP header 110 or to the mapped SL packet header 120 is recorded. For example, the CTSFlag, the CTS, DTSFlag, DTS, and the serial number are eliminated, but an access unit end flag (AUEF) is not eliminated since the AUEF is useful information marking an end of each connection unit. Also, if the SL packet header includes an OCR, the OCR is expressed in terms of a complementary number difference of two, and is stored in the residual SL packet 130. If the CTS does not exist for the SL packet having the OCR, the OCR is encoded as a difference between the RTP time stamp and the OCR. For a stream using an additional downward priority field within the SL packet header, only one SL packet having the same downward priority is transmitted by a single RTP packet in order to transmit the RTP packet according to appropriate QoS (Quality of Service). Further, only one first residual SL header of one RTP packet has the downward priority field. On the SL packet payload 140, an MPEG-4 stream transmitted through the RTP packet is accommodated.

If a plurality of the SL packets is mapped to the RTP packet as described above, the duplicated portion of the SL packet header and the RTP packet header are preferably eliminated to avoid unnecessary overhead. An MPEG-4 system of a related art achieves synchronization using a parameter provided by the RTP header. If the SL header is used, a duplicate field is eliminated from the SL header. The rest of the information of the SL header that is eliminated by elimination of the duplicate field is accommodated within the payload of the RTP packet, together with the payload of the SL packet.

For reference, a method of restoring multiple SL packets of a related art to restore the multiple SL packets generated by the foregoing criterion, is as follows. A packet sequence number for a first packet of the multiple SL packet is zero and becomes an index. A packet sequence number for the remaining SL packet, is a value achieved by summing one, a sum of a packet sequence number of a previous packet and an index delta of a relevant SL packet.

As a difference value is recorded for the CTS and the DTS, a time stamp flag is used to restore them. The RTP time stamp is 32 bits, and the RTP time stamp is mapped into a variety of the SL time stamp values. If the SL time stamp exceeds 32 bits, the lowest bit of the RTP time stamp becomes the SL time stamp. However, if a SL time stamp is less than 32 bits, the SL time stamp becomes a value achieved by sequentially summing an integer starting at zero, to an RTP time stamp. If the SL time stamp is 32 bits, the RTP time stamp is mapped unchanged.

If the CTS delta length is not defined and the time stamp is used, the CTSFlag of a first SL packet within the RTP packet becomes one, and the RTP time stamp is mapped into the CTS. In the meantime, if the CTS delta length is not defined and the time stamp is not used, the CTSFlag of the first SL packet and the CTS are ignored. At the moment, the CTSFlag and the CTS field for the remaining SL packets remain empty.

On the contrary, if the CTS delta length is defined, the time stamp is used, and if the connection unit beginning flag is one, the time stamp of the multiple SL packet becomes the CTSFlag, and a sum of the CTS delta of the multiple SL packet and the time stamp of the SL packet becomes the CTS. If the CTS delta length is defined, the time stamp is used, and if the connection unit beginning flag is not one, then the CTSFlag is ignored. However, if the CTS delta length is defined and the time stamp is not used, the reception side ignores the CTSFlag.

In case that the DTS delta length is not defined, if the time stamp is used and the connection unit beginning flag is one, then the DTSFlag is zero. On the contrary, in case that the DTS delta length is not defined, if the time stamp is used and the connection unit beginning flag is not one, then the DTSFlag is ignored. In the meantime, in case that the DTS delta length is defined, if the time stamp is used and the connection unit beginning flag is one, then the DTSFlag becomes the DTS flag of the multiple SL packet header, and the DTS becomes a value achieved by subtracting the DTS delta of the multiple SL packet header from the CTS. On the contrary, in case that the DTS delta length is defined, if the time stamp is used and the connection unit beginning flag is not one, the DTSFlag is ignored. If the DTS delta length is defined, but the time stamp is not used, the reception side ignores the DTSFlag.

The method of generating a multiple SL packet in the related art, however, does not sufficiently utilize the 32 bit length of the RTP time stamp if the length of the time stamp is less than 32 bits. Also, if the CTS value rolls over, the CTS delta value increases, so that a reduction in a number of bits, the purpose of using the CTS delta value, is not accomplished. For the SL packets having a time stamp's length l greater than 32 bits, the method of generating a multiple SL packet in the related art cannot be used. Further, the method of the related art is problematic since a negative number may appear upon generation of roll-over of the CTS or the DTS, and that negative number may possibly increase.

SUMMARY OF THE INVENTION

An aspect of the invention is to solve at least the above problems and/or disadvantages and to provide at least the advantages described hereinafter.

Additional aspects and advantages of the invention will be set forth in part in the description which follows and, in part, will be obvious from the description, or may be learned by practice of the invention.

Accordingly, one aspect of the present invention is to solve the foregoing problems by providing an apparatus and method of generating an RTP packet that utilizes a length of the RTP time stamp effectively and that makes a multiple SL packet for an SL packet exceeding a defined RTP time stamp length.

Another aspect of the present invention is to provide an apparatus and method for restoring an RTP packet that accommodates a plurality of the SL packets.

The foregoing and/or other aspects and advantages are realized by an apparatus for restoring an RTP (Real-Time Transport Protocol) packet that includes a setting unit and a packet generating unit. The setting unit is used to assign a CTS (Composition TimeStamp), a DTS (Decoding TimeStamp), and a PSN (Packet Sequence Number) that sequentially increase according to a packet generation order for each of a plurality of SL (Synchronization Layer) packets. The setting unit is also used to extract a time stamp length- and a packet sequence number length from an SLCD (SL Configuration Descriptor) within each SL packet. The packet generating unit is utilized to generate a header of the SL packet accommodated in an RTP packet header and the RTP packet based on the CTS, the DTS, the PSN, the time stamp length and the packet sequence number length.

The setting unit has a CTS generating unit assigning the CTS that sequentially increases from one according to a packet generation order for each of the SL packets, a DTS generating unit assigning the DTS that increases from zero according to a packet generation order for each of the SL packets, a PSN generating unit assigning the PSN that increases from zero according to a packet generation order for each of the SL packets, and an extracting unit extracting the time stamp length and the packet sequence number from the SLCD within each SL packet.

The packet generating unit has an RTP packet header generating unit generating an RTP packet header that includes an RTP time stamp calculated based on the CTS, a CTS delta generating unit generating a CTS delta based on the CTS and the RTP time stamp, a DTS delta generating unit generating a DTS delta based on the CTS and the DTS, and an index/index delta generating unit receiving the PSN, an index length, and an index delta length, and generating an index/index delta.

A method of generating an RTP packet according to the present invention includes assigning a CTS (Composition TimeStamp), a DTS (Decoding TimeStamp), and a PSN (Packet Sequence Number) that sequentially increase according to a packet generation order for each of a plurality of the SL (Synchronization Layer) packets, extracting a time stamp length and a packet sequence number length from an SLCD (SL Configuration Descriptor) within each SL packet, and generating a header of the SL packet accommodated in an RTP packet header and the RTP packet based on the CTS, the DTS, the PSN, the time stamp length and the packet sequence number length.

The assigning includes determining an RTP time stamp recorded on a header of the RTP packet based on the CTS of the SL packet accommodated first in the RTP packet and determining a CTS delta, a DTS delta and an index/index delta recorded on a header of the SL packet based on the determined RTP time stamp, the CTS, the DCT, the PSN and the index delta length.

Determining the RTP time stamp may comprise computing the RTP time stamp according to the following formula:

$$RTP\ time\ stamp = (CTS\ of\ the\ first\ SL\ packet)\%(RTP\ time\ stamp\ length)$$

Next, the CTS delta, the DTS delta, the index, and the index delta may be determined according to the following formula:

$$CTS\ delta(i) = CTS(i) - RTP\ time\ stamp$$

$$DTS\ delta(i) = CTS(i) - DTS(i)$$

$$Index(O) = PSN(O)\%\ 2^{index\ length}$$

$$Index\ delta(i) = (PSN(i) - PSN(i))\%\ 2^{index\ delta\ length}$$

Here, i stands for a packet sequence number of the SL packet.

An apparatus for restoring an RTP packet according to the present invention includes: a first restoring unit of restoring an RTP time stamp, a second restoring unit restoring a CTS of a first SL packet from the RTP time stamp and a CTS delta of a first SL packet, restoring a CTS of the remaining SL packets from a CTS of the restored first SL packet and a CTS delta of the remaining SL packet, a third restoring unit restoring a DTS of each of the SL packets from a CTS and DTS delta, and a fourth restoring unit restoring a PSN of the first SL packet from an index of the first SL packet, restoring a PSN of the remaining SL packets from a PSN of the restored first SL packet and an index delta of the remaining SL packets.

The apparatus may further include a first changing unit changing the CTS and the DTS based on a set time stamp length and a second changing unit changing the PSN based on a set packet sequence number length.

A method of restoring an RTP packet according to the present invention includes extracting an RTP time stamp from a received RTP packet, restoring a CTS for each of SL packets within a payload of the RTP packet, restoring a DTS from a DTS delta extracted from the CTS and each of the SL packets, and restoring a PSN based on an index and index delta extracted from the SL packets.

In one aspect, restoring the CTS restores the CTS according to the following formula:

$$CTS(1) = RTPtime\ stamp$$

$$CTS(i) = CTS(1) + CTS\ delta(i)$$

In another aspect, restoring the DTS restores the DTS according to the following formula:

$$DTS(i) = CTS(i) - DTSdelta(i)$$

In a further aspect, restoring the PSN restores the PSN according to the following formula:

$$PSN(O) = index$$

$$PSN(i) = PSN(i-1) + index\ delta(i) + 1$$

The method may further include a first operation of changing the CTS and the DTS based on a set time stamp length and a second operation of changing the PSN based on a set packet sequence number length.

In one aspect, the first operation of changing changes the CTS and the DTS according to the following formula:

$$CTS'(i) = CTS(i)\%time\ stamp\ length$$

$$DTS'(i) = DTS(i)\%time\ stamp\ length$$

In another aspect, the second operation of changing changes the PSN according to the following formula.

$$PSN'(i) = PSN(i)\%packet\ sequence\ number\ length$$

In the above formulae, i stands for a sequence number of the SL packet.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
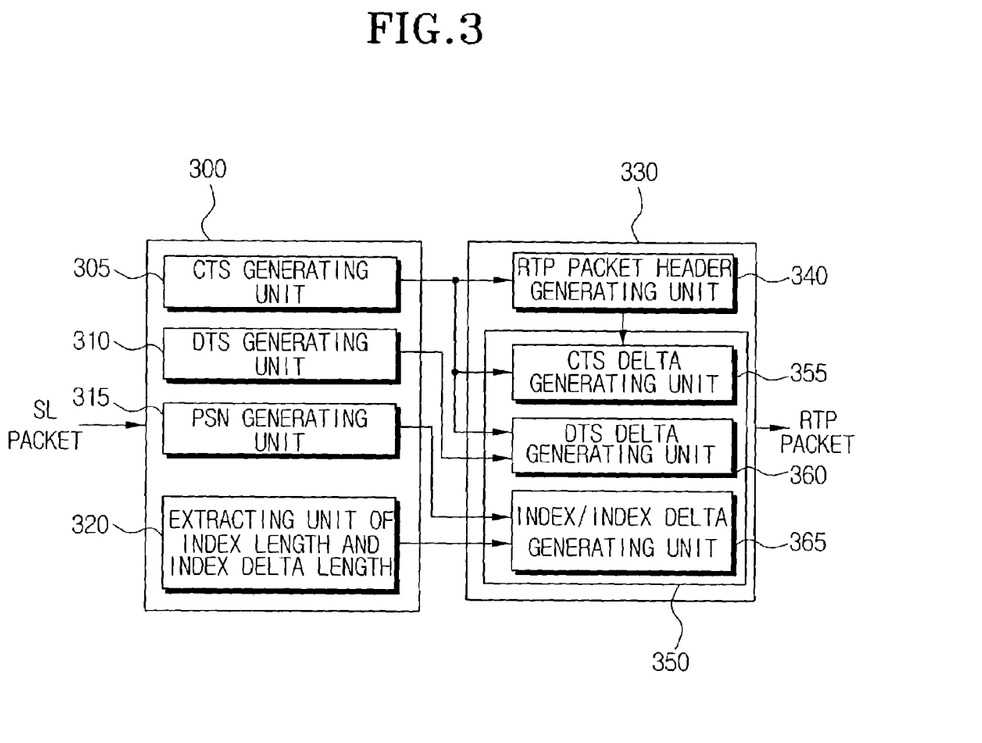
FIG. 3 is a block diagram illustrating construction of an embodiment of an apparatus for generating an RTP packet according to the present invention.
Figure 4:
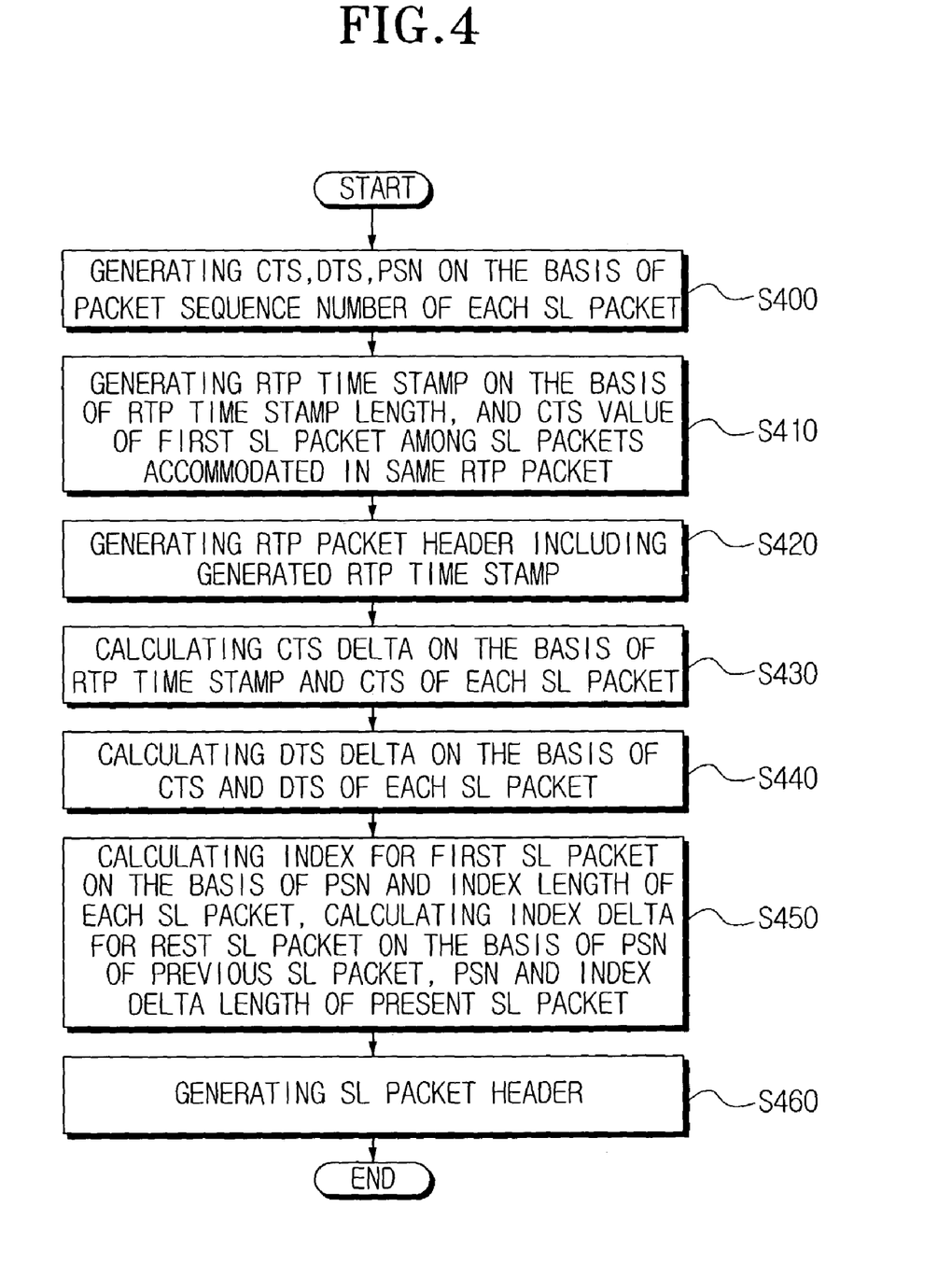
FIG. 4 is a flowchart of a method of generating a SL packet header according to an embodiment of the present invention.

FIG. 3 is a block diagram illustrating construction of an embodiment of an apparatus for generating an RTP packet according to the present invention, and FIG. 4 is a flowchart of one embodiment of a method of generating an RTP packet according to the present invention. Referring to FIGS. 3 and 4, an apparatus for generating and restoring RTP packet, includes a setting unit 300 and a packet generating unit 330. The setting unit 300 assigns a CTS (Composition TimeStamp), a DTS (Decoding TimeStamp), and a PSN (Packet Sequence Number) that sequentially increase according to a packet generation order for each of a plurality of SL (Synchronization Layer) packets and extracts a time stamp length and a packet sequence number length from an SLCD (SL Configuration Descriptor) within each SL packet. The setting unit 300 includes a CTS generating unit 305, a DTS generating unit 310, a PSN generating unit 315, and an extracting unit 320 of an index length and an index delta length.

Generally, assuming that a CTS, a DTS, and a PSN encoded on a time stamp length of the SLCD within the SL packet to the extent of a predetermined length are an ECTS, an EDTS, an EPSN, respectively, and a time stamp length, an index length, an index delta length, and a packet sequence number length are given by the following, then the ETCS, the EDTS, and the EPSN for each SL packet are as follows:

Time stamp length=3, Index length=2, Index delta length=2, Packet sequence number length=4
ECTS(1~15)={1, 2, 3, 4, 5, 6, 7, 0, 1, 2, 3, 4, 5, 6, 7}
EDTS(1~15)={0, 1, 2, 3, 4, 5, 6, 7, 0, 1, 2, 3, 4, 5, 6}
EPSN(1~15)={0, 1, 2, 3, 4, 5, 6, 7, 8, 9, 10, 11, 12, 13, 14}

These values are applied as time stamps within the SL packet. Here, j in ECTS(j), EDTS(j), and ESPN(j), stands for a packet number. The CTS, the DTS, and the PSN obtained in this manner, however, are inappropriate to apply to the present invention.

Therefore, the CTS generating unit 305 generates an accurate CTS from the ETCS. Similarly, the DTS generating unit 310 generates an accurate DTS from the EDTS, and the PSN generating unit 315 generates an accurate PSN from the EPSN (S400). Assuming that each value assigned from the CTS generating unit 305, the DTS generating unit 310, and the PSN generating unit 315 is an OCTS, an ODTS, and an OPSN, respectively, then values for each of SL packets are as follows:

OCTS(1~15)={1, 2, 3, 4, 5, 6, 7, 8, 9, 10, 11, 12, 13, 14, 15}
ODTS(1~15)={0, 1, 2, 3, 4, 5, 6, 7, 8, 9, 10, 11, 12, 13, 14}
OPSN(1~15)={0, 1, 2, 3, 4, 5, 6, 7, 8, 9, 10, 11, 12, 13, 14}
where 1~15 stands for a number of the SL packet, respectively.

The extracting unit 320 extracts a time stamp length and a packet sequence number length from the SLCD within the SL packet, and the packet generating unit 330 generates a header of the SL packet accommodated in an RTP packet header and the RTP packet based on the CTS, the DTS, the PSN, the time stamp length and the packet sequence number length. The packet generating unit 330 includes an RTP packet header generating unit 340 and an SL packet header generating unit 350.

The RTP packet header generating unit 340 generates the RTP time stamp based on the OCTS value generated from the CTS generating unit 305 (S410), generating an RTP packet header including the generated RTP time stamp (S420). If five SL packets are accommodated in the RTP packet, the remainder after the OCTS of the first SL packet within the RTP packet is divided by 32 (the length of the RTP time stamp length) and is determined as the RTP time stamp, which is expressed by the following formula:

$$RTP\ \text{time stamp}=(CTS\ \text{of first}\ SL\ \text{packet})\%(RTP\ \text{time stamp length}) \quad \text{Formula 1}$$

Therefore, the RTP time stamps for each RTP packet become 1, 6, and 11, respectively.

The SL packet header generating unit 350 includes: a CTS delta generating unit 355, a DTS delta generating unit 360, and an index/index delta generating unit 365.

The CTS delta generating unit 355 generates a CTS delta value for each of the SL packets according to the following formula based on the CTS value for each of the SL packets provided from the CTS generating unit 305 and the RTP time stamp generated from the RTP packet header generating unit 340.

$$CTS\ \text{delta}(i)=CTS(i)-RTP\ \text{time stamp} \quad \text{Formula 2}$$

where i stands for a packet sequence number of each SL packet.

The CTS delta values for the SL packet accommodated in each of the RTP packets, are as follows:
CTS delta(1~5)={0, 1, 2, 3, 4}: first RTP packet
CTS delta(6~10)={0, 1, 2, 3, 4}: second RTP packet
CTS delta(11~15)={0, 1, 2, 3, 4}: third RTP packet The DTS delta generating unit 355 generates a DTS delta value for each of the SL packets according to the following formula based on the CTS value for each of the SL packets provided from the CTS generating unit 305 and the DTS value for each of the SL packets provided from the DTS generating unit 310 (S440).

$$DTS\ \text{delta}(i)=CTS(i)-DTS(i) \quad \text{Formula 3}$$

where i stands for a packet sequence number of each SL packet.

The DTS delta values for the SL packet accommodated in each of the RTP packets, are as follows:
DTS delta(1~5)={1, 1, 1, 1, 1} first RTP packet
DTS delta(6~10)={1, 1, 1, 1, 1}: second RTP packet
DTS delta(11~15)={1, 1, 1, 1, 1}: third RTP packet The index/index delta generating unit 365 generates an index/index delta value for each of the SL packets according to the following formula based on the PSN value of each of the SL packets provided from the PSN generating unit 315 and the index length or the index delta length for each of the SL packets provided from the extracting unit 320 of the index length and an index delta length (S450).

$$\text{Index}(o)=PSN(o)\%2^{index\ length} \quad \text{Formula 4}$$

$$\text{Index delta}(i)=(PSN(i)-PSN(i-1))\%\ 2^{index\ length} \quad \text{Formula 5}$$

Formula 4 is used for obtaining an index for a first SL packet of each RTP packet, and Formula 5 is used for obtaining an index delta for a second SL packet or more of each RTP packet. The % sign means "modulo." In Formula 5, i stands for a packet sequence number of each SL packet.

Index and index delta values for the SL packets accommodated in each of the RTP packets, are as follows:
Index=0, Index delta(2~5)={0, 0, 0, 0}: first RTP packet
Index=1, Index delta(7~10)={0, 0, 0, 0}: second RTP packet
Index=2, Index delta(12~15)={0, 0, 0, 0}: third RTP packet The CTS delta, the DTS delta, the index/index delta are recorded in the generated SL packet header (S460), and then an RTP packet accommodating a plurality of the SL packets is generated.

Figure 5:
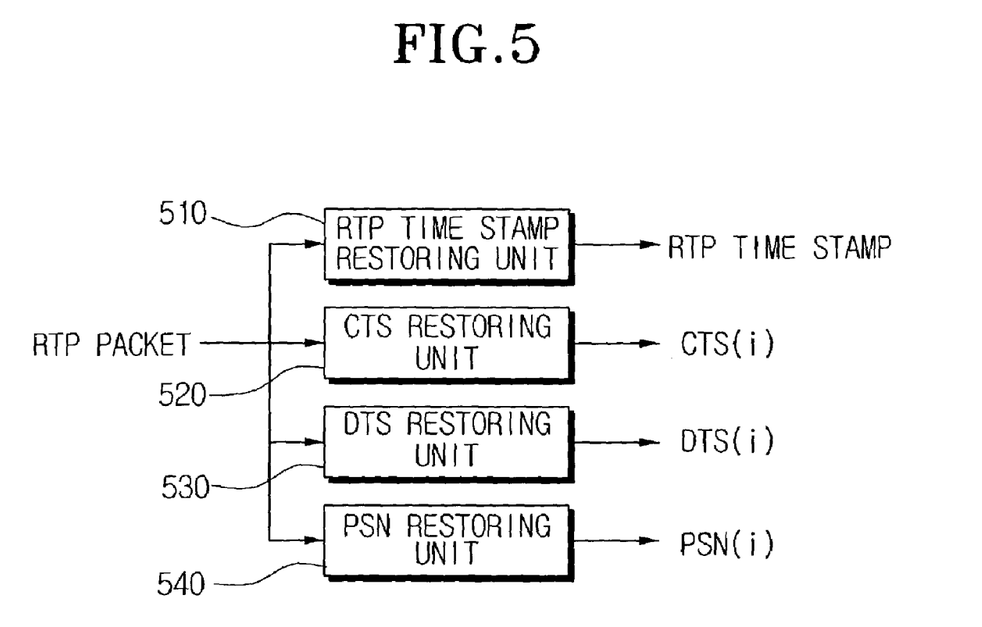
FIG. 5 is a block diagram illustrating construction of an apparatus for restoring an RTP packet according to an embodiment of the present invention.
Figure 6:
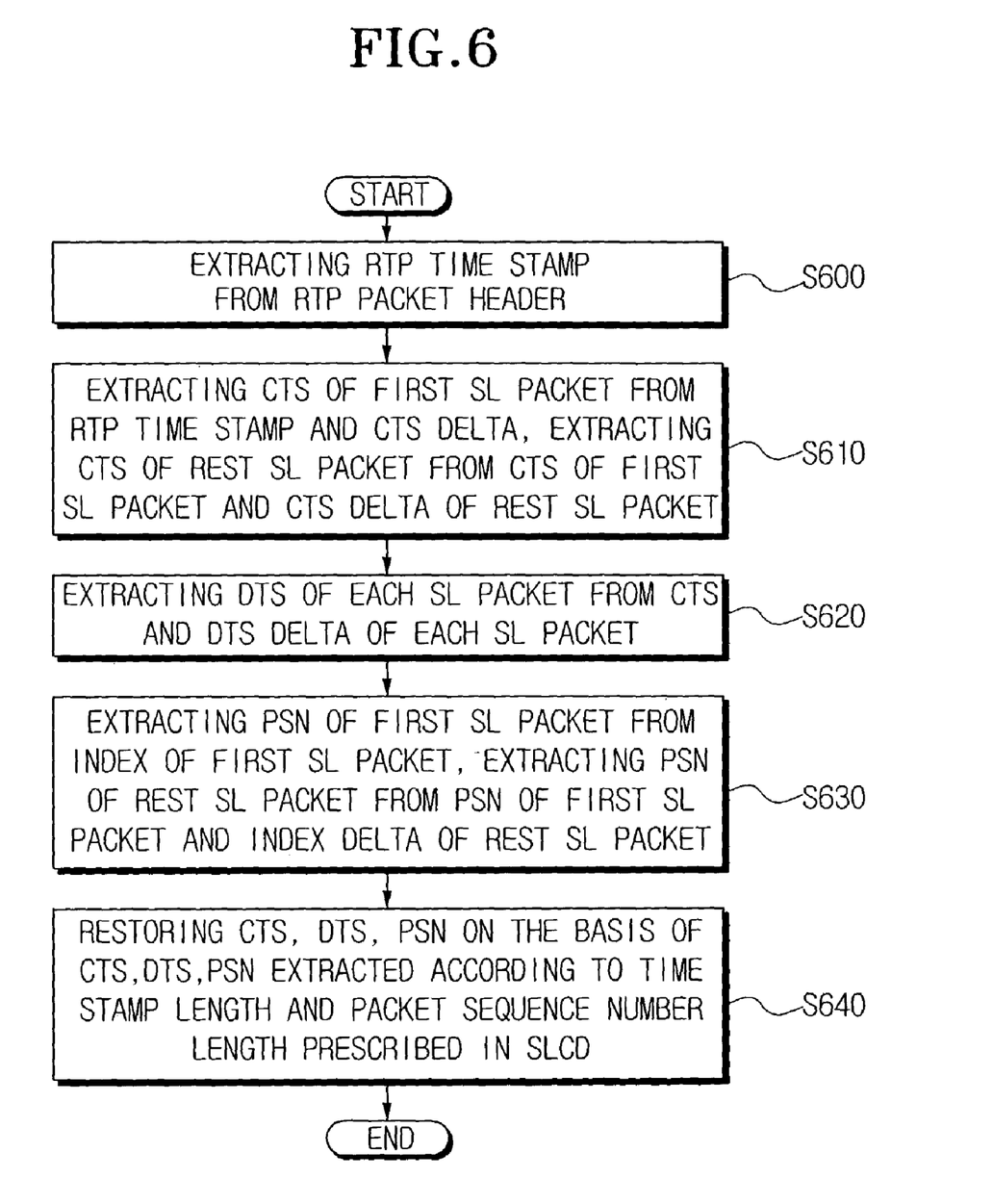
FIG. 6 is a flowchart of a method of restoring an RTP packet according to an embodiment of the present invention.

FIG. 5 is a block diagram illustrating construction of an embodiment of an apparatus for generating an RTP packet according to the present invention, and FIG. 6 is a flowchart of a method for generating an RTP packet according to the present invention. Referring to FIGS. 5 and 6, an apparatus for restoring the RTP packet according to the present invention includes an RTP time stamp restoring unit 510, a CTS restoring unit 520, a DTS restoring unit 530, and a PSN restoring unit 540.

The RTP time stamp restoring unit 510 extracts an RTP time stamp from a received RTP packet header (S600). Therefore, if the RTP packet generated by the apparatus and method of generating the RTP packet described with reference to FIGS. 3 and 4 is received, the RTP time stamps extracted from the RTP time stamp restoring unit 510 for each of the RTP packets, become 1, 6, and 11, respectively.

The CTS restoring unit 520 restores a CTS of a first SL packet from the RTP time stamp provided from the RTP time stamp restoring unit 510 and a CTS delta of the first SL packet, and then restores a CTS of the remaining SL packets from a CTS of the restored first SL packet and a CTS delta of the remaining SL packets (S610). The CTS of the first SL packet and the CTS of the remaining SL packets are restored according to the following formula:

$$CTS(1)=RTP \text{ time stamp}$$

$$CTS(i)=CTS(1)+CTS \text{ delta}(i) \qquad \text{Formula 6}$$

where i stands for a packet sequence number of each SL packet.

The restored CTS for each of the RTP packets, are as follows:
CTS(1~5)={1, 2, 3, 4, 5}: first RTP packet
CTS(6~10)={6, 7, 8, 9, 10}: second RTP packet
CTS(11~15)={11, 12, 13, 14, 15}: third RTP packet The DTS restoring unit 530 restores a DTS of each of the SL packets from the CTS and the DTS delta according to the following formula (S620):

$$DTS(i)=CTS(i)-DTS \text{ delta}(i) \qquad \text{Formula 7}$$

where i stands for a packet sequence number of each SL packet.

The restored DTS for each of the RTP packets, are as follows:
DTS(1~5)={0, 1, 2, 3, 4}: first RTP packet
DTS(6~10)={5, 6, 7, 8, 9}: second RTP packet
DTS(11~15)={10, 11, 12, 13, 14}: third RTP packet The PSN restoring unit 540 restores a PSN of the first SL packet from an index of the first SL packet, restoring a PSN of the remaining SL packets from the PSN of the first SL packet and an index delta of the remaining SL packets (S630). The PSN of the first SL packet and the PSN of the remaining SL packets are restored by the following formula:

$$PSN(1)=index$$

$$PSN(i)=PSN(i-1)+index \text{ delta}(i)+1 \qquad \text{Formula 8}$$

where i stands for a packet sequence number of each SL packet.

The restored PSN for each of the RTP packets are as follows:
PSN(1~5)={0, 1, 2, 3, 4}: first RTP packet
PSN(6~10)={5, 6, 7, 8, 9}: second RTP packet
PSN(11~15)={10, 11, 12, 13, 14}: third RTP packet In the meantime, the restored CTS and DTS are preferably changed to conform to the set time stamp length (S640). In that case, the apparatus for restoring the RTP packet according to the present invention further includes a time stamp changing unit (not shown). The time stamp changing unit changes the restored CTS and the DTS according to the following formula:

$$CTS'(i)=CTS(i)\%\text{time stamp length}$$

$$DTS'(i)=DTS(i)\%\text{time stamp length} \qquad \text{Formula 9}$$

Also, the restored PSN is preferably changed to conform to the set packet sequence number length (S640). In that case, the apparatus for restoring the RTP packet according to the present invention further includes a packet sequence number changing unit (not shown). The packet sequence number changing unit changes the restored PSN according to the following formula:

$$PSN'(i)=PSN(i)\%\text{packet sequence number length}, \qquad \text{Formula 10}$$

In and, i stands for a packet sequence number of SL packet.

The CTS, the DTS, the PSN for each of the RTP packets changed through the foregoing changing processes, are as follows:
First RTP Packet:
CTS'(1~5)={1, 2, 3, 4, 5}
DTS'(1~5)={0, 1, 2, 3, 4}
PSN'(1~5)={0, 1, 2, 3, 4}
Second RTP Packet:
CTS'(6~10)={6, 7, 0, 1, 2}
DTS'(6~10)={5, 6, 7, 0, 1}
PSN'(6~10)={5, 6, 7, 8, 9}
Third RTP Packet:
CTS'(11~15)={3, 4, 5, 6, 7}
DTS'(11~15)={2, 3, 4, 5, 6}
PSN'(11~15)={10, 11, 12, 13, 14}

Figure 7:
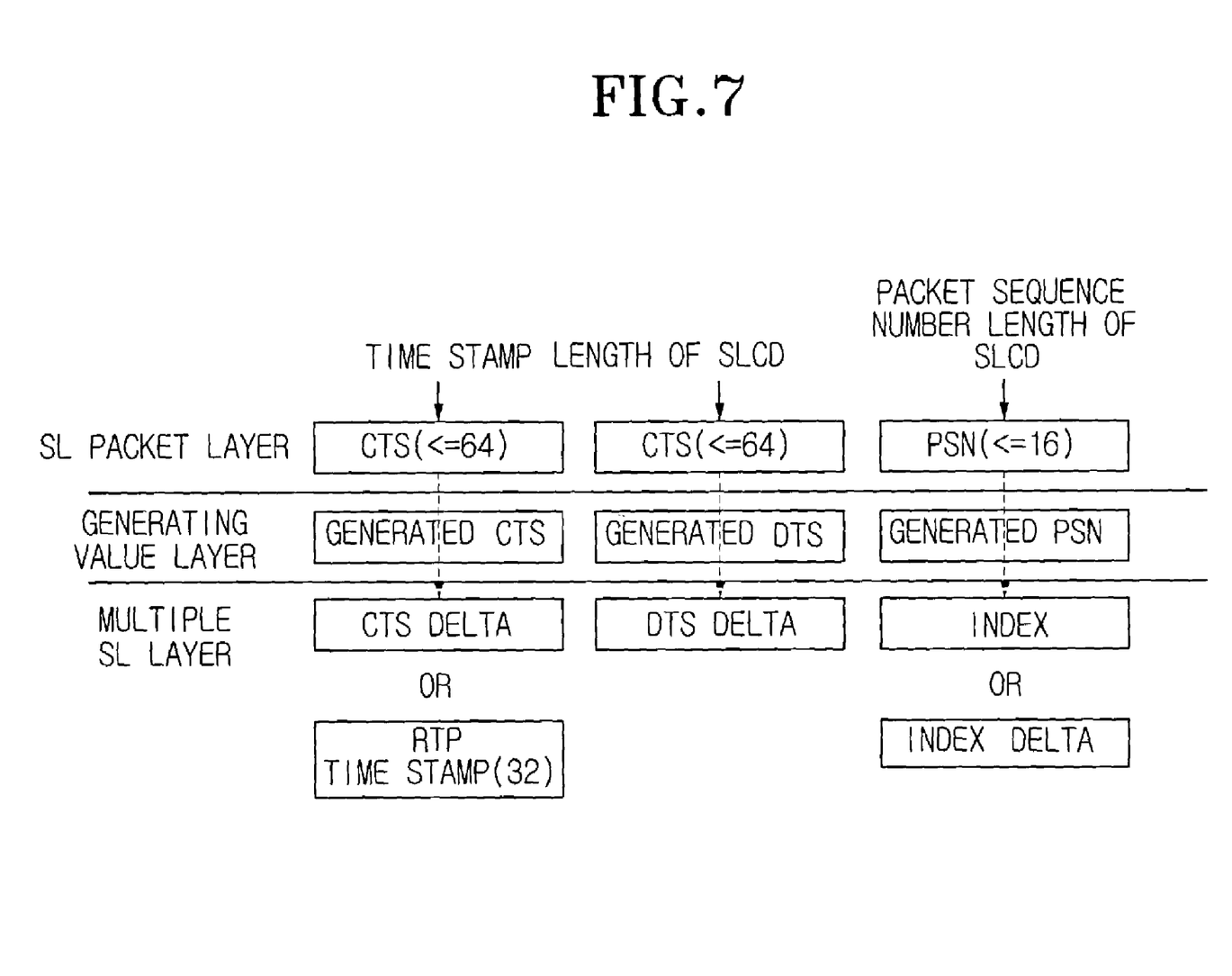
FIG. 7 is a drawing illustrating a procedure of generating a multiple SL RTP packet from SL packets in accordance with an embodiment of the present invention.
Figure 8:
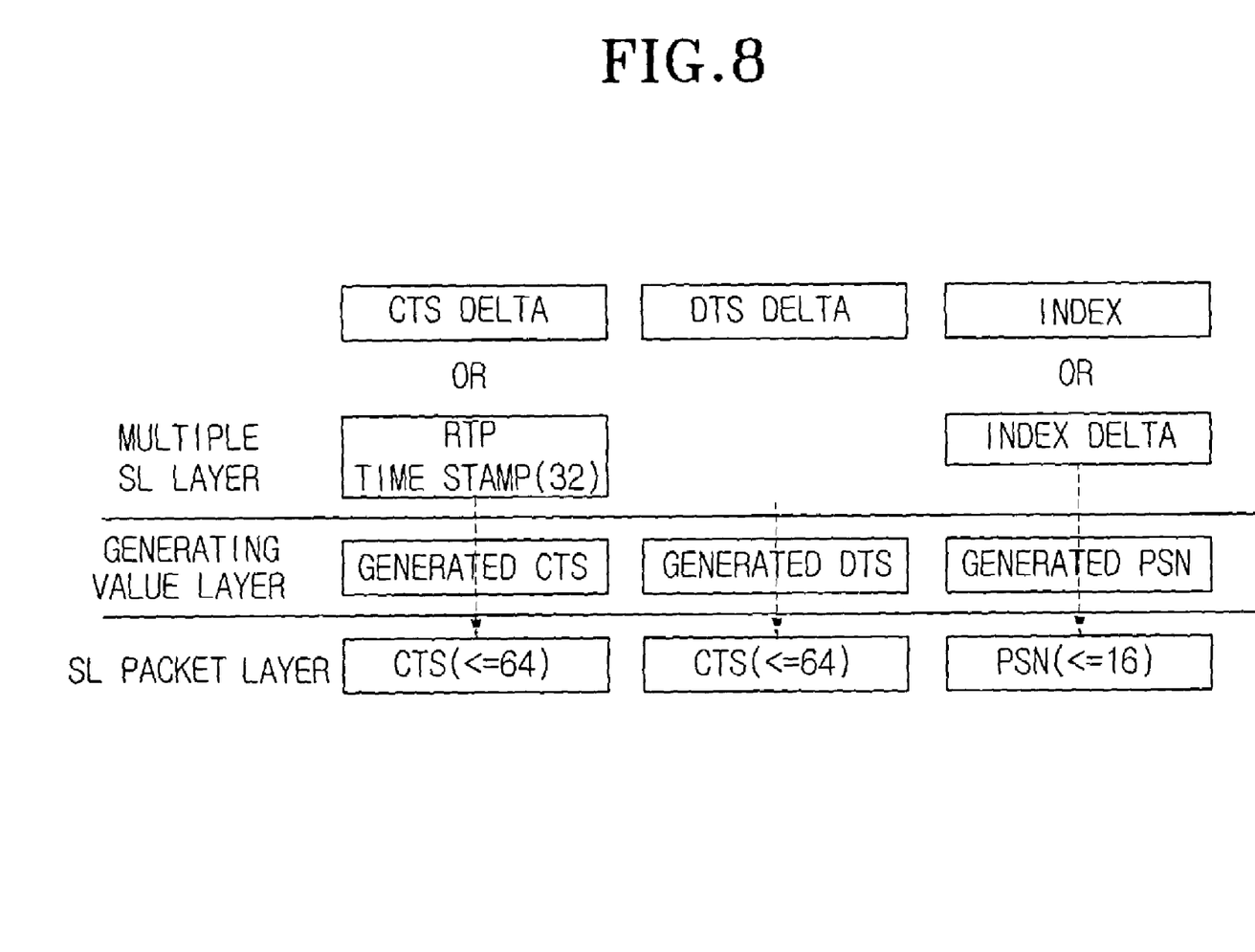
FIG. 8 is a drawing illustrating a procedure of restoring a CTS, a DTS, and a PSN from a received multiple SL RTP packet in accordance with an embodiment of the present invention.

FIG. 7 is a drawing illustrating an embodiment of a procedure of generating a multiple SL RTP packet from SL packets, and FIG. 8 is a drawing illustrating an embodiment of a procedure of restoring a CTS, a DTS, and a PSN from a received multiple SL RTP packet. Referring to FIGS. 7 and 8, a SL packet layer is configured such that the CTS and the DTS have lengths according to the time stamp of the SLCD, the PSN has a length according to the time stamp of the SLCD, and the CTS, the DTS and the PSN are expressed in terms of the ECTS, the EDTS, and the EPSN, respectively. Each element existing on the SL packet layer corresponds to a generated CTS, a generated DTS, and a generated PSN on a generating value layer. Also, an element of a SL packet layer is expressed in terms of elements of a multiple SL layer based on the generating value layer and is accommodated within the RTP packet. At a reception side, a plurality of the SL packets encapsulated into the RTP packet, proceeds through each layer in a reverse order with respect to a layer order upon generation, and is finally separated into each SL packet. The reception side restores the MPEG-4 stream transmitted in the form of the SL packet.

The apparatus and method of generating and restoring the RTP packet, according to the present invention, reduces a number of bits if the CTS value rolls over and difference values in the CTS, the DTS, and the PSN information between the previous SL packet and the present SL packet are recorded for each of the SL packets upon transmission of a plurality of the SL packets with a use of a single RTP packet, and constructs a multiple SL packet out of the SL packets whose time stamp is more than 32 bits. Also, the DTS delta value is a positive number. According to the apparatus and method of generating and restoring the RTP packet in the present invention, the DTS delta value becomes a positive number, and generation of a DTS delta having a large value is prevented. Further, if a roll-over is generated for the PSN, a value appropriate for the assigned index delta value is generated. Also, on the transmission side, an examination to check whether a roll-over is generated is not necessary, and on the reception side, only the number of roll-overs needs to be examined. Thus, an encoding procedure at the transmission side and an decoding procedure at the reception side are simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for restoring an RTP (Real-Time Transport Protocol) packet comprising:
   a setting unit assigning a CTS (Composition TimeStamp), a DTS (Decoding TimeStamp), and a PSN (Packet Sequence Number) that sequentially increase according to a packet generation order for each of a plurality of SL (Synchronization Layer) packets, and extracting a time stamp length and a packet sequence number length from an SLCD (SL Configuration Descriptor) within each SL packet; and
   a packet generating unit generating a header of each SL packet accommodated in an RTP packet header and the RTP packet based on the CTS, the DTS, the PSN, the time stamp length and the packet sequence number length,
   wherein the packet generating unit comprises:
   an RTP packet header generating unit generating an RTP packet header including an RTP time stamp calculated based on the CTS, and RTP time stamp=(CTS of first SL packet) % (RTP time stamp length), wherein % represents modulo;
   a CTS delta generating unit generating a CTS delta based on the CTS and the RTP time stamp;
   a DTS delta generating unit generating a DTS delta based on the CTS and the DTS; and
   an index/index delta generating unit receiving the PSN, an index length, and an index delta length and generating an index/index delta.

2. The apparatus according to claim 1, wherein the setting unit comprises:
   a CTS generating unit assigning the CTS that sequentially increases from one according to a packet generation order for each of the SL packets;
   a DTS generating unit assigning the DTS that increases from zero according to the packet generation order for each of the SL packets;
   a PSN generating unit assigning the PSN that increases from zero according to the packet generation order for each of the SL packets; and
   an extracting unit extracting the time stamp length and the packet sequence number from the SLCD within each of the SL packets.

3. A method of generating an RTP packet, comprising:
   assigning a CTS (Composition TimeStamp), a DTS (Decoding TimeStamp), and a PSN (PacketSequenceNumber) that sequentially increase according to a packet generation order for each of a plurality of SL (Synchronization Layer) packets;
   extracting a time stamp length and a packet sequence number length from a SLCD (SL ConfigurationDescriptor) within each SL packet; and
   generating a header of each SL packet accommodated in an RTP packet header and the RTP packet based on the CTS, the DTS, the PSN, the time stamp length and the packet sequence number length,
   wherein the assigning comprises:
   a first determining of an RTP time stamp recorded on a header of the RTP packet based on the CTS of each SL packet accommodated first in the RTP packet; and
   a second determining of a CTS delta, a DTS delta and an index/index delta recorded on a header of each SL packet based on the RTP time stamp determined, the CTS, the DCT, the PSN and the index delta length, and
   wherein the first determining comprises the RTP time stamp according to the following formula, in which:
   RTP time stamp =(CTS of first SL packet) % (RTP time stamp length), wherein % represents modulo.

4. The method according to claim 3, wherein the second determining comprises the CTS delta, the DTS delta, the index, and the index delta according to the following formula, in which:

CTS delta($i$)=CTS($i$)−RTP time stamp

DTS delta($i$)=CTS($i$)−DTS($i$)

Index(O)=PSN(O)%2

Index delta($i$)=(PSN($i$)−PSN($i$))%2 where i stands for a packet sequence number of each SL packet and % represents modulo.

5. An apparatus of restoring an RTP (Real-Time Transmission Protocol) packet comprising:
   a first restoring unit restoring an RTP time stamp, wherein RTP time stamp=(CTS of first SL packet) % (RTP time stamp length), wherein % represents modulo, CTS represents Composition TimeStamp, and SL represents Synchronization Layer;
   a second restoring unit restoring a CTS (Composition TimeStamp) of a first SL packet from the RTP time stamp and a CTS delta of the first SL packet, restoring a CTS of remaining SL packets from a CTS of a restored first SL packet and a CTS delta of the remaining SL packets;
   a third restoring unit restoring a DTS (Decoding TimeStamp) of each of the SL packets from a CTS and a DTS delta; and
   a fourth restoring unit restoring a PSN (Packet Sequence Number) of the first SL packet from an index of the first SL packet, restoring a PSN of the remaining SL packets from a PSN of the restored first SL packet and an index delta of the remaining SL packets.

6. The apparatus according to claim 5, further comprising:
   a first changing unit changing the CTS and the DTS based on a set time stamp length; and
   a second changing unit changing the PSN based on a set packet sequence number length.

7. A method of restoring an RTP (Real-Time Transmission Protocol) packet comprising
   extracting an RTP time stamp from a received RTP packet, restoring a CTS (Composition TimeStamp) for each of a plurality of SL packets within a payload of the received RTP packet;
   restoring a DTS (Decoding TimeStamp) from a DTS delta extracted from the CTS and each of the SL packets; and restoring a PSN (Packet Sequence Number) based on an index and an index delta extracted from each of the SL packets, wherein the restoring of the CTS comprises restoring the CTS according to a first formula, restoring the DTS comprises restoring the DTS according to a second formula, and restoring the PSN comprises restoring the PSN according to a third formula, respectively, in which:

the first formula comprises:

CTS(1)=RTPtime stamp; and

CTS($i$)=CTS(1)+CTS delta($i$);

the second formula comprises:

DTS($i$)=CTS($i$)−DTSdelta($i$); and the third formula comprises:

PSN(1)=index; and

PSN($i$)=PSN($i$) index delta(i)+1;

where i stands for a packet seguence number of each SL packet.

8. The method according to claim 7, further comprising:

a first changing of the CTS and the DTS based on a set time stamp length; and a second changing of the PSN based on a set packet sequence number length.

9. The method according to claim 8, wherein the first changing comprises changing the CTS and the DTS according to a first formula, and the second changing comprises changing the PSN according to a second formula, respectively, in which:

the first formula comprises:

CTS'(i)=CTS(i) % time stamp length; and

DTS'(i)=DTS(i) % time stamp length; and the second formula comprises:

PSN (i)=PSN(i) % packet sequence number length; and where i stands for a packet sequence number of the SL packet and % represents modulo.

10. An apparatus for restoring an RTP (Real-Time Transport Protocol) packet, comprising:

a setting unit, setting preselected time and sequence information for, and obtaining preselected SLCD (SL Configuration Descriptor) information from, a plurality of SL (Synchronization Layer) packets; and a packet generating unit, generating a header of each SL packet in the RTP packet using the preselected time and sequence information and the preselected SLCD information, wherein the packet generating unit comprises:

an RTP packet header generating unit generating an RTP packet header including an RTP time stamp calculated based on the CTS and RTP time stamp=(CTS of first SL packet) % (RTP time stamp length), wherein % represents modulo;

a CTS delta generating unit generating a CTS delta based on the CTS and the RTP time stamp;

a DTS delta generating unit generating a DTS delta based on the CTS and the DTS; and an index/index delta generating unit receiving the PSN, an index length, and an index delta length and generating an index/index delta.

11. The apparatus according to claim 10, wherein the preselected time and sequence information for the plurality of SL packets includes a CTS (Composition TimeStamp), a DTS (Decoding TimeStamp), and a PSN (Packet Sequence Number) that sequentially increase according to a packet generation order for each of the plurality of SL packets.

12. The apparatus according to claim 10, wherein the preselected SLCD information includes a time stamp length and a packet sequence number length from a SLCD (SL Configuration Descriptor) within each SL packet.

13. An article of manufacture comprising a computer-readable storage medium having stored thereon computer-executable instructions for performing the method of claim 3.

14. An article of manufacture comprising a computer-readable storage medium having stored thereon computer-readable instructions for performing the method of claim 7.

15. An apparatus for generating a multiple SL (Synchronization Layer) RTP (Real-Time Transport Protocol) packet from a plurality of SL packets, comprising:

a multiple SL packet layer unit, configuring a CTS (Composition TimeStamp), a DTS (Decoding TimeStamp) and a PSN (Packet Sequence Number) having lengths according to a time stamp of an SLCD (SL Configuration Descriptor) within each SL packet;

a generating value layer unit, generating a generated CTS, a generated DTS and a generated PSN based on the CTS, the DTS and the PSN of the multiple SL packet layer; and a multiple SL layer unit, generating a multiple SL packet header of a multiple SL packet accommodated in an RTP packet header and the RTP packet based on a CTS delta/RTP time stamp, a DTS delta, and an index/index delta, wherein the generating value layer unit comprises:

an RTP packet header generating unit generating an RTP packet header including an RTP time stamp calculated based on the CTS, and RTP itme stamp=(CTS of first SL packet) % (RTP time stamp length), wherein % represents modulo;

a CTS delta generating unit generating a CTS delta based on the CTS and the RTP time stamp;

a DTS delta generating unit generating a DTS delta based on the CTS and the DTS; and an index/index delta generating unit receiving the PSN, an index length, and an index delta length and generating an index/index delta.

16. An apparatus for restoring a multiple SL (Synchronization Layer) RTP (Real-Time Transport Protocol) packet having a plurality of SL packets, comprising:

a multiple SL layer restoring unit, restoring a CTS (Composition TimeStamp) delta/RTP time stamp, a DTS (Decoding TimeStamp) delta, and an index/index delta from a multiple SL packet header of a multiple SL packet accommodated in an RTP packet header and the RTP packet;

a generating value layer restoring unit, restoring a generated CTS, a generated DTS and a generated PSN (Packet Sequence Number) based on the CTS delta/RTP time stamp, the DTS delta, and the index/index delta from the multiple SL packet header of the multiple SL packet; and a multiple SL packet layer restoring unit, restoring a CTS, a DTS and a PSN for each SL packet of the multiple SL packet, wherein the generating value layer restoring unit comprises:

an RTP packet header generating unit generating an RTP packet header including an RTP time stamp calculated based on the CTS and RTP time stamp=(CTS of first SL packet) % (RTP time stamp length), wherein % represents modulo;

a CTS delta generating unit generating a CTS delta based on the CTS and the RTP time stamp;

a DTS delta generating unit generating a DTS delta based on the CTS and the DTS; and an index/index delta generating unit receiving the PSN, an index length, and an index delta length and generating an index/index delta.

* * * * *

UNITED STATES PATENT AND TRADEMARK OFFICE
CERTIFICATE OF CORRECTION

PATENT NO. : 7,366,204 B2 Page 1 of 1
APPLICATION NO. : 10/401752
DATED : April 29, 2008
INVENTOR(S) : Sang-ug Kang et al.

It is certified that error appears in the above-identified patent and that said Letters Patent is hereby corrected as shown below:

Column 12, Line 28 (Approx.), after "2" insert --$^{\text{index length}}$--.

Column 12, Line 30 (Approx.), after "2" insert --$^{\text{index delta length}}$--.

Column 12, Line 61, after "comprising" insert --:--.

Column 13, Line 21 (Approx.) change "PSN(i)=PSN(i) index delta (i)+1" to --PSN(i)=PSN(i-1)+ index delta(i) +1--

Column 13, Line 22, change "seguence" to --sequence--.

Column 13, Line 40, change "PSN (i)=PSN(i) % packet sequence number length;" to --PSN' (i)=PSN(i) % packet sequence number length;--.

Column 14, Line 38, change "itme" to --time--.

Signed and Sealed this

Sixteenth Day of September, 2008

JON W. DUDAS
*Director of the United States Patent and Trademark Office*